US006795950B2

(12) United States Patent
Matsushita et al.

(10) Patent No.: US 6,795,950 B2
(45) Date of Patent: Sep. 21, 2004

(54) PRINTED CIRCUIT BOARD DESIGN SYSTEM

(75) Inventors: Hideharu Matsushita, Kawasaki (JP); Masayuki Nakayama, Oyama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/942,643

(22) Filed: Aug. 31, 2001

(65) Prior Publication Data

US 2002/0046387 A1 Apr. 18, 2002

Related U.S. Application Data

(63) Continuation of application No. PCT/JP99/01038, filed on Mar. 4, 1999.

(51) Int. Cl.[7] .......................... G06F 17/50; G06F 19/00
(52) U.S. Cl. .............................. 716/4; 703/13; 700/98
(58) Field of Search .............................. 716/1, 2, 4, 5, 716/11, 15, 19, 20; 703/1, 13–14, 20; 700/98, 118, 121; 345/419, 964

(56) References Cited

U.S. PATENT DOCUMENTS

| 5,297,053 A | * | 3/1994 | Pease et al. | 700/182 |
| 5,644,687 A | * | 7/1997 | Agonafer et al. | 345/419 |
| 6,334,115 B1 | * | 12/2001 | Kuribayashi et al. | 705/27 |

FOREIGN PATENT DOCUMENTS

| JP | 6-266807 | 9/1994 |
| JP | 9-311878 | 12/1997 |

OTHER PUBLICATIONS

Free et al., "Recent Advances in Thermal/Flow Simulation: Integrating Thermal Analysis into the Mechanical Design Process," Eleventh IEEE SEMI–THERM Symposium, 1995, pp. 136–145.*
Hubing et al., "EMC Applications of EMAP–2: A 3D Finite Element Modeling Code," IEEE Int'l Symposium on Electromagnetic Compatibility, 1993, pp. 279–283.*
Osterberg et al., "MemBuilder': An Automated 3D Solid Model Construction Program for Microelectromechanical Structures," The 8th Int'l Conference on Solid–State Sensors and Actuators, 1995, pp. 21–24.*
Yook et al., "Application of System–L vel EM Modeling to High–Speed Digital IC Packages and PCB's," IEEE Trans. on Microwave Theory and Techniques, vol. 45, No. 10, 1997, pp. 1847–1856.*

* cited by examiner

Primary Examiner—Leigh M. Garbowski
(74) Attorney, Agent, or Firm—Stass & Halsey LLP

(57) ABSTRACT

A printed circuit board design system performs, with a 3D-CAD system, a mounting design including a cabinet. In order to prepare, without mistakes in less man-hours, an accurate 3D model of a printed circuit board provided to the 3D-CAD system, a converter converts the printed circuit board into a unit-type model, a division-type model, a single-type model, and a library-type model composed of one or more models based on attributes preliminarily added to a mounting component stored in a mounting design DB storage.

10 Claims, 17 Drawing Sheets

| FIG.2A | FIG.2B | FIG.2C |
|---|---|---|
| COMPONENT NAME  I1<br>COMPONENT SPECIFICATION  P-SPEC1<br>COMPONENT CLASSIFICATION  ELECTRIC COMPONENT<br>SMD/IMD CLASSIFICATION  SMD<br>COMPONENT HEIGHT  2.0mm<br>FIXING FLAG  NONFIXED<br>ARRANGEMENT FLAG  ARRANGED<br>ARRANGED SIDE  Ln<br>ARRANGED COORDINATES  (10,10)<br>NUMBER OF COMPONENT PINS  8<br>COMPONENT SHAPE ELEMENT<br>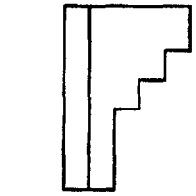 | COMPONENT NAME  E1<br>COMPONENT SPECIFICATION  E-SPEC<br>COMPONENT CLASSIFICATION  MECHANICAL COMPONENT<br>SMD/IMD CLASSIFICATION  IMD<br>COMPONENT HEIGHT  5.0mm<br>FIXING FLAG  FIXED<br>ARRANGEMENT FLAG  ARRANGED<br>ARRANGED SIDE  Ln<br>ARRANGED COORDINATES  (100,10)<br>NUMBER OF COMPONENT PINS  0<br>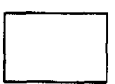 | COMPONENT NAME  Q1<br>COMPONENT SPECIFICATION  Q-SPEC<br>COMPONENT CLASSIFICATION  PSEUDO COMPONENT<br>SMD/IMD CLASSIFICATION  SMD<br>COMPONENT HEIGHT  0.0mm<br>FIXING FLAG  FIXED<br>ARRANGEMENT FLAG  ARRANGED<br>ARRANGED SIDE  Ln<br>ARRANGED COORDINATES  (50,50)<br>NUMBER OF COMPONENT PINS  1 |
| FIG.2D | FIG.2E | FIG.2F |
| COMPONENT NAME  I2<br>COMPONENT SPECIFICATION  P-SPEC<br>COMPONENT CLASSIFICATION  ELECTRIC COMPONENT<br>SMD/IMD CLASSIFICATION  SMD<br>COMPONENT HEIGHT  2.0mm<br>FIXING FLAG  NONFIXED<br>ARRANGEMENT FLAG  UNARRANGED<br>ARRANGED SIDE  —<br>ARRANGED COORDINATES  —<br>NUMBER OF COMPONENT PINS  8<br>COMPONENT SHAPE ELEMENT<br>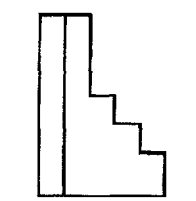 | COMPONENT NAME  E2<br>COMPONENT SPECIFICATION  E-SPEC<br>COMPONENT CLASSIFICATION  MECHANICAL COMPONENT<br>SMD/IMD CLASSIFICATION  IMD<br>COMPONENT HEIGHT  5.0mm<br>FIXING FLAG  FIXED<br>ARRANGEMENT FLAG  ARRANGED<br>ARRANGED SIDE  Ln<br>ARRANGED COORDINATES  (100,10)<br>NUMBER OF COMPONENT PINS  0 | COMPONENT NAME  I3<br>COMPONENT SPECIFICATION  Q-SPEC<br>COMPONENT CLASSIFICATION  ELECTRIC COMPONENT<br>SMD/IMD CLASSIFICATION  SMD<br>COMPONENT HEIGHT  2.0mm<br>FIXING FLAG  NONFIXED<br>ARRANGEMENT FLAG  ARRANGED<br>ARRANGED SIDE  L1<br>ARRANGED COORDINATES  (50,50)<br>NUMBER OF COMPONENT PINS  8<br>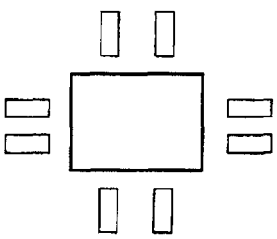 |

3D MODELING FOR TWO COMPONENTS

3D MODELING FOR THREE COMPONENTS

3D MODELING FOR SINGLE COMPONENT

3D MODELING FOR
SEVEN COMPONENTS

ELECTRIC COMPONENT

MECHANICAL COMPONENT

3D CONVERSION BY ADDING HEIGHT

3D CONVERSION BY ADDING HEIGHT

82 PSEUDO SHAPE MODEL

H=2.0mm

83 DETAILED SHAPE MODEL

K=5.0mm

FIG.18
PRIOR ART
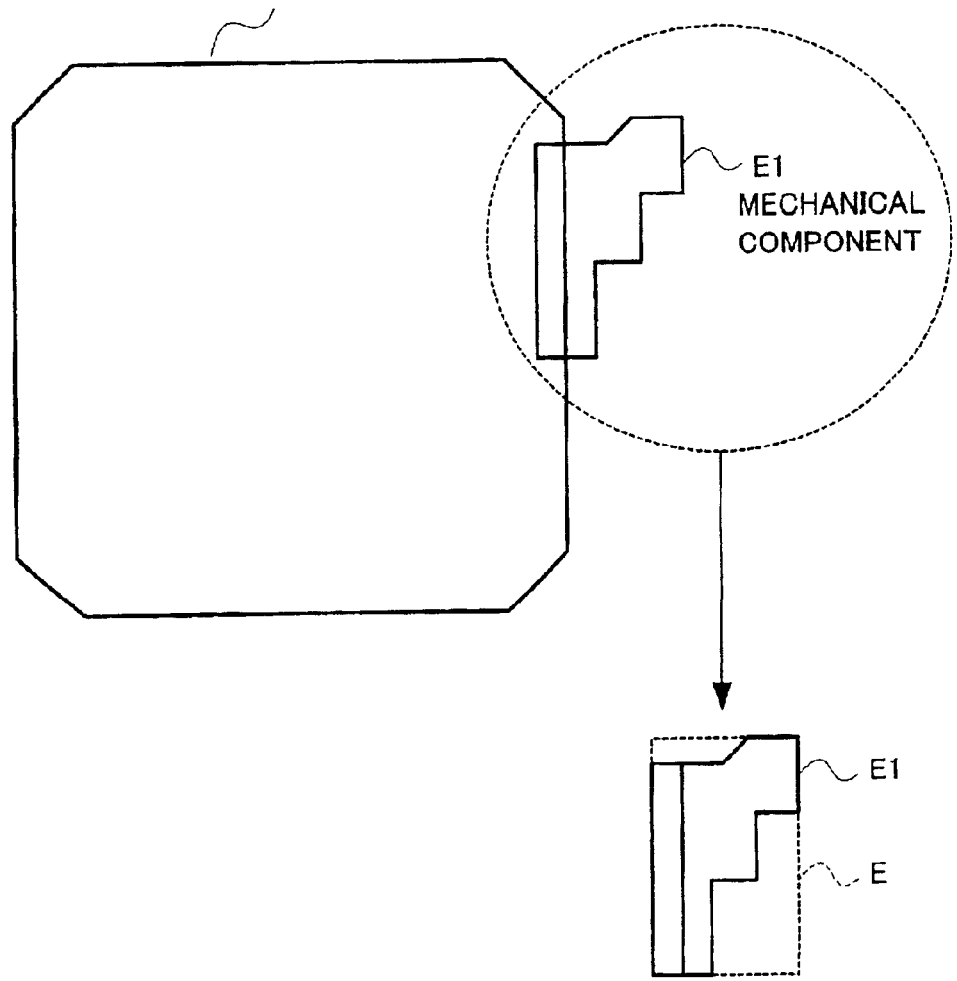
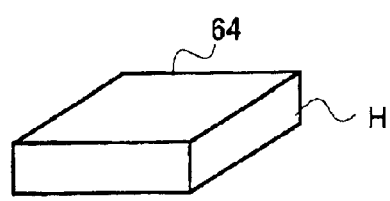

PRINTED CIRCUIT BOARD DESIGN SYSTEM

This application is a continuing application, filed under 35 U.S.C. §111(a), of International Application PCT/JP99/01038, filed Mar. 4, 1999.

BACKGROUND OF THE INVENTION

1. Field of the Invention

The present invention relates to a printed circuit board design system, and in particular to a printed circuit board design system for performing, with a three-dimensional (3D)-CAD system, a mounting design including a cabinet.

2. Description of the Related Art

In recent electronic equipment such as mobile terminal equipment, not only the downsizing/complication of its shape but also the reduction of its TTM (Time To Market) has been demanded. With this demand, its printed circuit board has been downsized/complicated, so that accuracy of outer dimensions, which is required for removing an interference with a cabinet, and besides reduction of mounting design man-hours have been demanded.

A prior art printed circuit board design system completes the arrangement of mounting components (parts) on a printed board, and then generates a 3D (three-dimensional) model (data) of a printed circuit board unit. Based on this model, a 3D-CAD (Computer-Aided Design) system has determined whether or not the printed circuit board and the cabinet interfere with each other.

FIG. 15 shows an arrangement of a printed circuit board design system (hereinafter occasionally abbreviated as PCB-CAD system) 10 and a 3D-CAD system 30.

The PCB-CAD system 10 is composed of a PCB mounting design DB (Data Base) storage 11 and a 3D converter 13 which inputs PCB information stored in the PCB mounting design DB storage 11 and 3D component LIB (Library) information from the 3D-CAD system 30 to provide a 3D model of the printed circuit board to the 3D-CAD system 30.

The 3D-CAD system 30 is composed of a 3D model storage 31 for storing the 3D model of the printed circuit board, a cabinet interference inspecting portion 34 for inspecting a cabinet interference based on model information stored in the 3D model storage 31, a 3D component LIB storage 33 for storing the 3D component library information, and a manual input portion 35 for inputting data of the components in the 3D component LIB storage 33 based on a management sheet 36.

FIG. 16 shows a prior art procedure example for preparing a 3D model of a printed circuit board.

The PCB-CAD system 10 firstly arranges the components on the printed board to perform the mounting design of the printed circuit board (at step S70 in FIG. 16), which is repeated until the component arrangement is completed (at step S71).

When the component arrangement is completed, the 3D converter 13 converts the printed circuit board into the 3D model to be sent to the 3D-CAD system 30 (at step S72).

In the 3D-CAD system 30, the 3D model storage 31 stores the 3D model received, while the cabinet interference inspecting portion 34 inspects the interference between the 3D model and the cabinet (at step S73).

When the components are required to be moved because of a contact between the printed circuit board and the cabinet, or a dimensional shortage, the procedure returns to step S70 to execute a rearrangement of the components (at step S74). Hereafter, the same procedures are repeated until the component move becomes unnecessary. When the move is not required, a wiring/design rule check (DRC) of the printed circuit board is performed to complete the operation (at step S75).

The components mounted on the printed board comprise ones required to be arranged on fixed positions (hereinafter occasionally referred to as fixed components), and ones whose arranged positions can be moved (hereinafter occasionally referred to as nonfixed (unfixed) components).

FIG. 17 shows a procedure in case where both fixed and nonfixed components are included in the procedure of the 3D model preparation shown in FIG. 16.

The PCB-CAD system 10 performs the mounting design of the printed circuit board 50 which mounts thereon a fixed component I4, and nonfixed components I5 and I6 on a printed board 51. The 3D converter 13 converts the printed circuit board 50 into the 3D model to be sent to the 3D-CAD system 30.

In the 3D-CAD system 30, the cabinet interference inspecting portion 34 performs the interference inspection between the received 3D model and the cabinet. In the presence of the interference, the component is required to be moved or the dimensions of the cabinet to be changed in order to avoid the interference. However, fixed/nonfixed states of the components I4–I6 can not be recognized by the 3D models.

Therefore, in order to recognize the fixed component on the 3D-CAD system 30 before the interference inspection, the color of the fixed component was changed.

FIG. 18 shows a 3D model of a mechanical component mounted on the printed board 51.

The 3D converter 13 firstly converts a mechanical component E1 of a complicated shape into the maximum rectangle E, and then makes a rectangular parallelepiped, which has the rectangle E as a base and the maximum height H of the component E1, a pseudo 3D model of the mechanical component E1.

In 3D modeling by such a prior art PCB-CAD system, there is a possibility that man-hours increase and manual mistakes occur as follows:

① The 3D model conversion was not performed before completing the arrangement of the mounting component in the printed circuit board 50.

② When the change of the component shape occurred in the PCB-CAD system 10, the component shape at the library in the 3D-CAD system 30 was correspondingly changed by the manual input portion 35. For this reason, data for identical components stored in the PCB mounting design DB storage 11 and the 3D component LIB storage 33 were occasionally different from each other.

Also, in the 3D-CAD system 30, whether or not the 3D model of the component in the printed circuit board 50 is the 3D component model of the 3D component LIB was visually recognized.

③ In the printed circuit board mounting design, the attributes of the components; an arranged component/unarranged component, a fixed component/nonfixed component, a manufactured height (rise) by soldering, a pseudo component (switching land or the like) were not taken into consideration, so that they could not be recognized.

Therefore, the component models in which the display color is changed in order to recognize the fixed component/unarranged component on the 3D-CAD system 30 and the manufactured height is taken into consideration were prepared before the interference inspection.

④ The mechanical component or the like was modeled by the maximum rectangular shape, so that the inspection of the cabinet interference was inaccurate, leading to an occurrence of interference which does not inherently exist. Therefore, the accurate shape of the mechanical component was provided from the manual input portion 35 of the 3D-CAD system 30.

SUMMARY OF THE INVENTION

It is accordingly an object of the present invention to provide a printed circuit board design system generating a 3D model of a printed circuit board which mounts thereon a component on a printed board, performing, with a 3D-CAD system, a mounting design including a cabinet, and generating an accurate 3D model of the printed circuit board to be provided to the 3D-CAD system.

In order to achieve the above-mentioned object, the printed circuit board design system according to the present invention comprises: a converter for converting the printed circuit board into one or more models based on attributes preliminarily added to the component.

Namely, the converter can disassemble the printed circuit board into one or more constitutional elements according to the attributes preliminarily added to the component, and convert the constitutional elements into the models.

Thus, the printed circuit board can be disassembled into a plurality of portions corresponding to the attributes of the mounting component to perform a modeling, so that accurate modeling can be done without mistakes in less man-hours depending on design stages of the printed circuit board.

Also, in the present invention, when the attribute is a mounting side, the above-mentioned converter may convert the printed board and a component mounted on an L1 side into an L1 side portion model, and may convert the printed board and a component mounted on an Ln side into an Ln side portion model.

Namely, the converter can divide the printed circuit board into the model composed of the printed board and the component mounted on the L1 side (surface), and the model composed of the printed board and the component mounted on the Ln side (underside) to be generated.

Thus, the L1 side portion model and the Ln side portion model are merged by the common printed board, thereby enabling the model of the printed circuit board to be prepared and enabling the man-hours to be reduced in comparison with the case where a printed circuit board unit is modeled.

Also, in the present invention, when the attribute is one of an arrangement and a fixation, the above-mentioned converter may convert the component which is not arranged on the printed circuit board into an unarranged component model, and may convert the component which is not fixed into a nonfixed component model.

Namely, the converter converts the component which is not arranged on the printed board into the unarranged component model which can be recognized to be not arranged as the model, and generates the nonfixed component model which can be recognized to be not fixed as the model of the component not fixed on the printed board.

Thus, the 3D-CAD system can recognize whether or not the mounting component is already arranged or fixed on the printed board, and can verify the propriety of the position by moving the position of the component which is not yet arranged or fixed on the 3D-CAD system depending on the design stages.

Also, in the present invention, the above-mentioned converter may convert the printed board and the component into a library model related to the attribute.

Namely, the converter can convert the printed board and the component mounted thereon into the models, and make the models in the form of a library based on the attributes.

Based on the library, the arrangement of the mounting component and the like can be studied by using the 3D-CAD system.

Also, in the present invention, the above-mentioned converter may convert the component into either a pseudo shape model or a detailed shape model.

Namely, the converter can generate a model of e.g. an electronic component in the components mounted on the printed board by a simplified pseudo shape model of a rectangular parallelepiped, a cylinder, or the like, and can prepare a model of a mechanical component by an accurate detailed shape model.

Thus, the printed circuit board can be modeled with divided into portions requiring accuracy and portions which can be simplified, thereby enabling the man-hours and the time required for modeling to be reduced.

BRIEF DESCRIPTION OF THE DRAWINGS

FIGS. 2A–2F are diagrams showing a database example (No. 1) of a printed board mounting design in a printed circuit board design system according to the present invention;

FIG. 18 is a diagram showing a conversion example of a 3D model of a mechanical component in a prior art printed circuit board design system.

Throughout the figures, like reference numerals indicate like or corresponding components.

DESCRIPTION OF THE EMBODIMENTS

The present invention will be described referring to the attached drawings in order to specify the invention in more detail.

Figure 1:
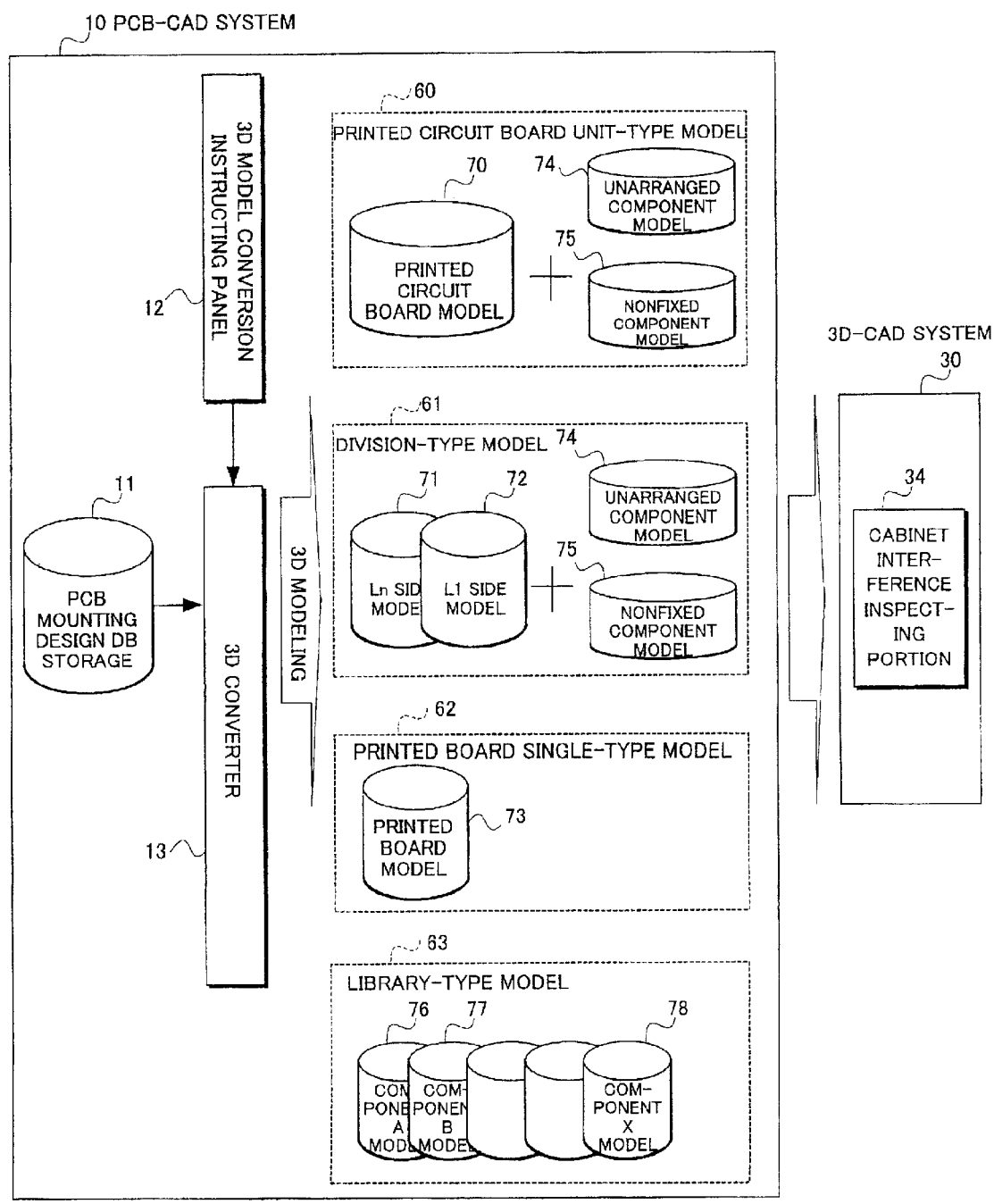
FIG. 1 is a block diagram showing an embodiment of a printed circuit board design system according to the present invention.

FIG. 1 shows an embodiment of a PCB-CAD system 10 according to the present invention. This CAD system 10 is composed of a PCB mounting design DB (database) storage 11, a 3D converter 13 for inputting information of a PCB mounting design DB from the DB storage 11 and for converting a printed circuit board into a 3D model, and a 3D model conversion instructing panel 12 for instructing the 3D converter of the condition of the conversion.

Also, FIG. 1 shows 3D model examples converted by the 3D converter, including a printed circuit board unit-type model 60, a division-type model 61, a printed board single-type model 62, and a library-type model 63.

The unit-type model 60 is composed of a printed circuit board model 70, an unarranged component model 74, and a nonfixed component model 75. The division-type model 61 is composed of an Ln side model 71, an L1 side model 72, an unarranged component model 74, and a nonfixed component model 75. The printed board single-type model 62 is composed only of a printed board model 73. The library-type model 63 is composed of a model 76 of a component A to a model 78 of a component X forming the printed circuit board.

Furthermore, FIG. 1 shows a 3D-CAD system 30, which inputs any one of the models 60–63 to perform an interference inspection of the printed circuit board and a cabinet in a cabinet interference inspecting portion 34.

FIGS. 2A–2F and 3 respectively show data examples of the components and the printed board held by the DB storage 11.

FIGS. 2A–2F respectively show data of components I1, E1, Q1, I2, E2, and I3. The elements of the data, i.e. attributes are composed of a component name, a component specification name, a component classification indicating either an electric component or a mechanical component, an SMD/IMD classification, a component height, a fixing flag indicating whether the component is fixed or nonfixed (unfixed), an arrangement flag indicating whether the component is arranged or unarranged, an arrangement side indicating whether an arranged side is Ln side or L1 side, arranged coordinates, the number of component pins, and a component shape element indicating a component plane shape.

The component I1, for example, is the electric component with 8 pins whose specification name is "P-SPEC1" and whose height of the SMD-type is 2 mm, and its plane shape is shown in the component shape element. The component I1 is arranged at the coordinates (10,10) on the Ln side of the printed board, nonfixed, and movable. It is to be noted that since the component Q1 is a pseudo component of a land or the like, its height is 0 mm.

Figure 3:
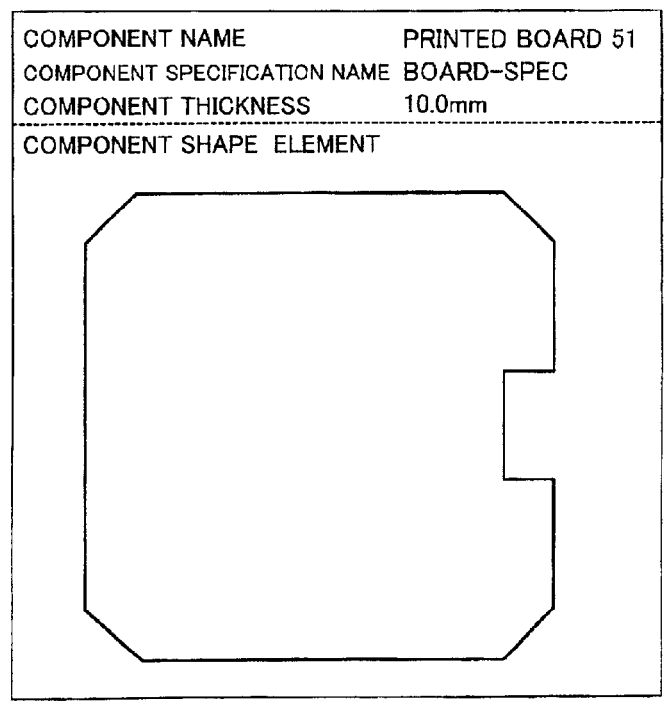
FIG. 3 is a diagram showing a database example (No. 2) of a printed board mounting design in a printed circuit board design system according to the present invention.

The data of FIG. 3 show that a specification name of a printed board 51 is "BOARD-SPEC", the board thickness is 10.0 mm, and the shape is a component shape element.

Figure 4:
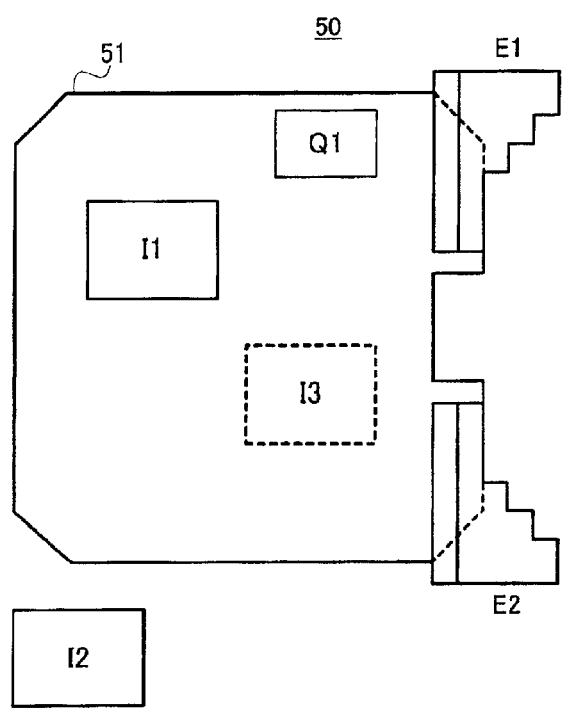
FIG. 4 is a diagram showing an example of a component arrangement in a printed circuit board by a mounting design of a printed circuit board design system according to the present invention.

FIG. 4 shows an arrangement example of mounting components on a printed circuit board 50 at which the PCB-CAD system 10 has performed the mounting design based on the above-mentioned PCB mounting design DB.

The components I1, Q1, E1, and E2 are mounted on the Ln side, and the component I3 is mounted on the L1 side. Since being not arranged, the component I2 is not mounted on the printed board 51.

Figure 5:
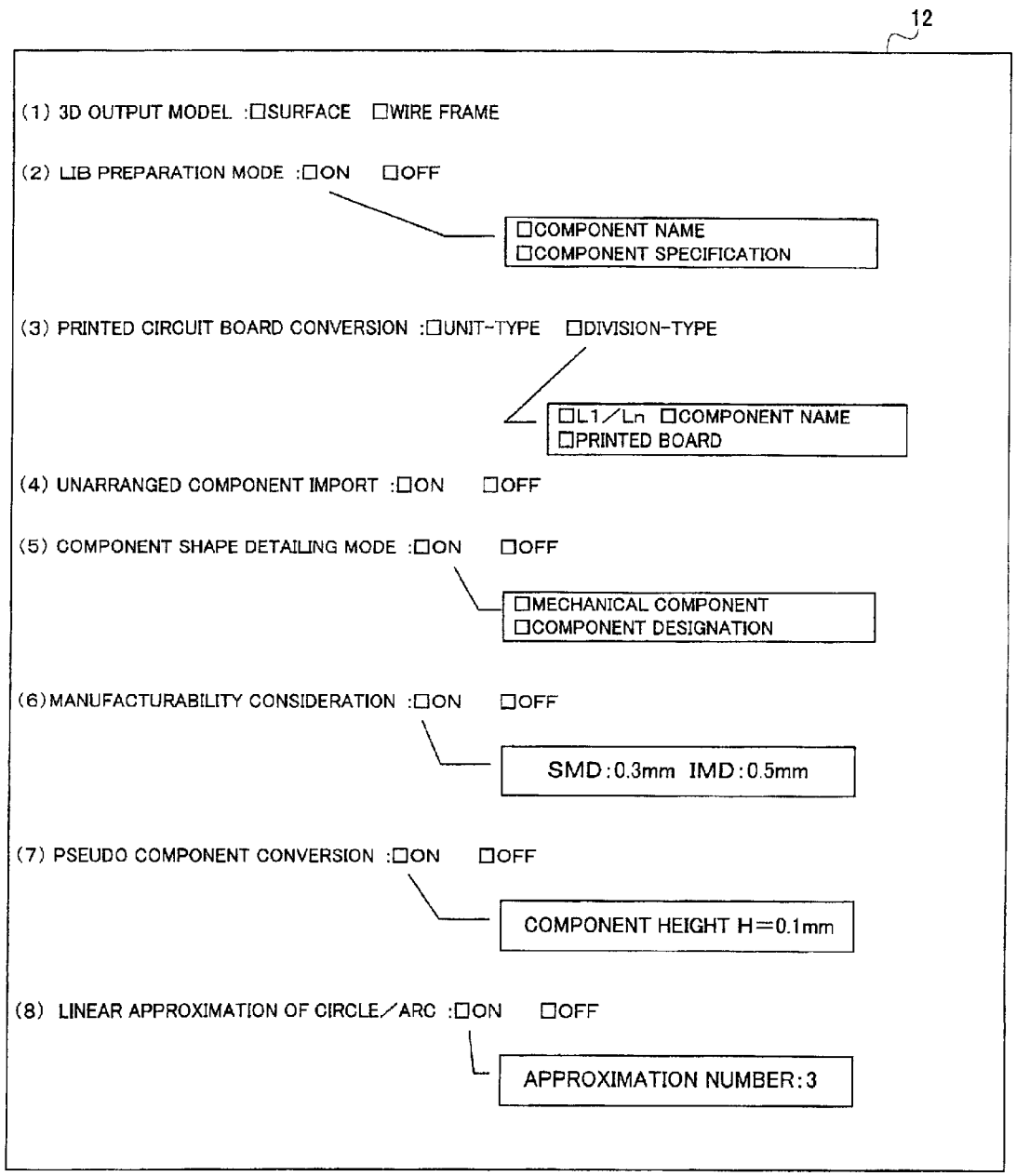
FIG. 5 is a diagram showing an embodiment of a 3D model conversion instructing panel of a printed circuit board design system according to the present invention.

FIG. 5 shows an embodiment of a 3D model conversion instructing panel 12. Items which can be designated by this panel 12 are as follows:

(1) "3D output model" for designating either a surface or a wire frame as a shape representing method;

(2) "LIB preparation mode" for designating whether or not a library should be prepared, and for designating the preparation, when the library should be prepared, either by "component name" or "component specification";

(3) "Printed circuit board conversion" for designating the printed circuit board model either by a unit-type or a division-type, and further for designating any of "L1 side/Ln side" division, "component name" library, and single "printed board" when the division-type is designated;

(4) "Unarranged component import" for designating whether or not an unarranged component should be imported;

(5) "Component shape detailing mode" for designating whether or not the component shape should be converted into a detailed model, and for designating the component to be converted into detailed modeling by "mechanical component" or "component designation" when the component shape should be converted;

(6) "Manufacturability consideration" for designating whether or not the manufacturability by soldering should be considered, and for designating values of soldering for respective SMD and IMD when the manufacturability consideration should be designated;

(7) "Pseudo component conversion" for designating whether or not a pseudo component of a land arranged e.g. for a switch, or the like should be made in the form of 3D modeling, and for designating the component height when the 3D modeling should be designated;

(8) "Linear approximation of circle/arc" for designating whether or not a circle or an arc should be approximated to a line, and for designating "approximation number" when the linear approximation of circle/arc should be designated.

According to the settings of these items, the 3D converter 13 converts the mounting components and the printed circuit board into one or more 3D models based on the attributes.

It is to be noted that other items may be added to the above-mentioned items, such as items for designating a model conversion only to a component exceeding a limit value of a component height per Ln side or L1 side, items for designating the 3D conversion to a library coordinates system of an unarranged component, and items for designating intermediate data of a 3D model e.g. as an IGES rule.

Figure 6:
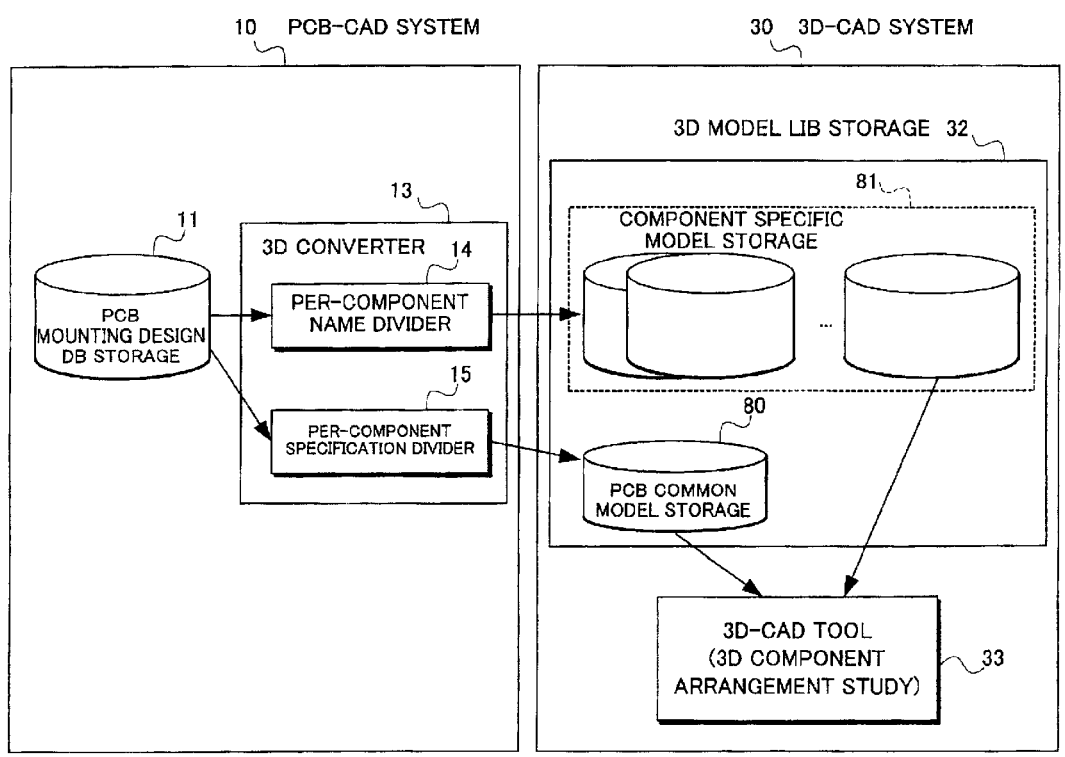
FIG. 6 is a block diagram showing a generation example of a 3D model in a printed circuit board design system according to the present invention.

FIG. 6 shows a procedure by which the 3D converter 13 converts the printed circuit board into the 3D model designated by the above-mentioned item "printed circuit board conversion".

When the "unit-type" shown in FIG. 1 is designated by the panel 12 in FIG. 5, a per-component name divider 14 of the 3D converter 13 makes reference to the data from the DB storage 11 for generating the unarranged component model 74 of the component whose "arrangement flag" is "unarranged", and the nonfixed component model 75 of a certain component whose "arrangement flag" is "arranged" while "fixing flag" is "nonfixed". These component models are stored in a component specific model storage 81.

A per-component specification divider 15 prepares the unit-type model 60 of the printed circuit board 50 composed of the printed board 51 and the component whose "fixing flag" is "fixed". This unit model 60 is stored in a PCB common model storage 80.

When the "division-type" is designated, and the "L1 side/Ln side" and "printed board" respectively corresponding to the "division-type" and "single-type" shown in FIG. 1 are designated, the per-component specification divider 15 prepares any of the L1 side model 72, the Ln side model 71, and the printed board single model 62, which is stored in the PCB common model storage 80.

When the "component name" corresponding to the "library-type" in FIG. 1 is designated, the per-component name divider 14 prepares the models 76–78 of the designated components to be stored in the component specific model storage 81.

Figure 7:
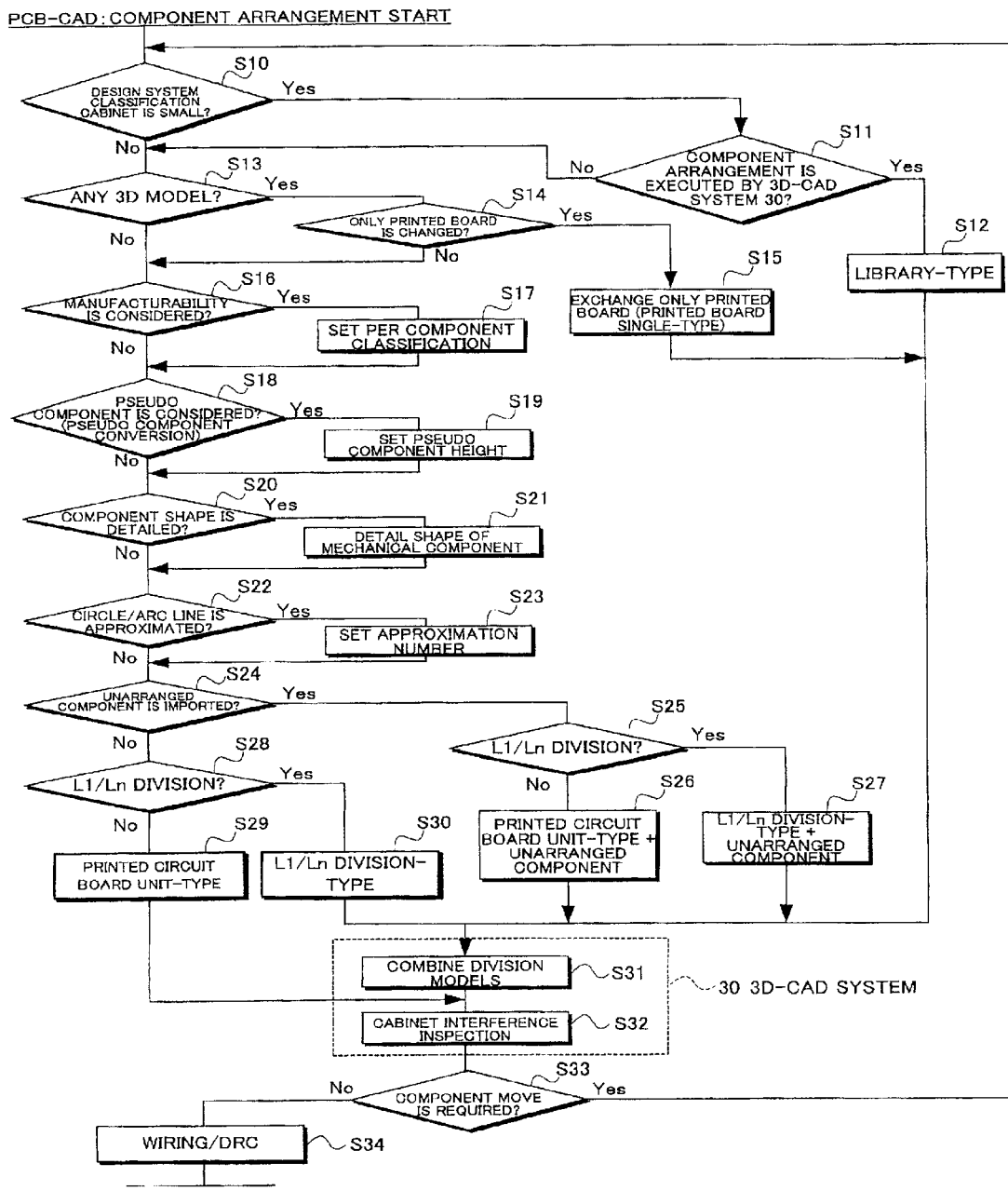
FIG. 7 is a flow chart showing an operation procedure of a printed circuit board design system according to the present invention.

FIG. 7 shows an operation example performed by the PCB-CAD system 10 according to the present invention based on the operation of the panel 12 shown in FIG. 5. Hereinafter, this operation procedure will be described.

The PCB-CAD system 10 checks the classification of the design system where the printed circuit board 50 is mounted (at step S10 in FIG. 7). When the cabinet is small, it is determined whether or not the component arrangement of the printed circuit board 50 is carried out by the 3D-CAD system 30 (at step S11).

When the component arrangement is carried out by the 3D-CAD system 30, the model of the library-type is generated (at step S12) to be transferred to the 3D-CAD system 30.

It is to be noted that the shape of the prepared model is represented by a surface or a wire frame designated by the "3D output model" of the panel 12 in FIG. 5.

In the 3D-CAD system 30, the division models are combined to prepare the whole model of the printed circuit board 50 (at step S31), the interference inspection between the model and the cabinet is performed (at step S32), so that the result of whether or not the component move is required (at step S33) is notified to the PCB-CAD system 10.

When the component move is required, the CAD system 10 returns to step S10. Otherwise wiring/design rule is checked to complete the process (at step S34).

When the cabinet is found large at step S10 and the 3D-CAD system 30 does not carry out the component arrangement at step S11, whether or not there is a 3D model is determined (at step S13). If there is a 3D model and only the printed board 51 is changed (at step S14), the 3D model conversion is performed only to the printed board 51, and then the process proceeds to the above-mentioned step S31 (at step S31) to perform a cabinet interference inspection by the model of the single printed board.

When there is no 3D model at steps S13 and S14, the printed board 51 is not changed, and "manufacturability consideration" is designated at the panel 12 shown in FIG. 5 (at step S16), the "value of soldering" is set per component classification (at step S17), and then the process proceeds to step S18. When the "manufacturability consideration" is not designated, the process directly proceeds to step S18.

When the "pseudo component conversion" is designated at step S18, the "pseudo component height" is set (at step S19), and then the process proceeds to step S20. When the "pseudo component conversion" is not designated, the process directly proceeds to step S20.

When the "component shape detailing mode" is designated at step S20, and e.g. the mechanical component is designated, the shape detailing of the mechanical component is set (at step S21), and then the process proceeds to step S22. When the "component shape detailing mode" is not designated, the process directly proceeds to step S22.

When the "linear approximation of circle/arc" is performed at step S22, the "approximation number" is set (at step S23), and then the process proceeds to step S24. When the "linear approximation of circle/arc" is not performed, the process directly proceeds to step S24.

In case the "unarranged component import" is performed at step S24 and the division of the "L1 side/Ln side division" is designated, the 3D converter 13 prepares the L1 side/Ln side division-type model and the unarranged component model (at step S27), and otherwise prepares the printed board single model and the unarranged component model (at step S26), so that the prepared models are sent to the 3D-CAD system 30. Hereafter, the operations at the above-mentioned step S31 and following steps will be performed.

Returning to step S24, when the "unarranged component import" is not performed, the L1 side/Ln side division-type model or the printed circuit board unit-type model is prepared depending on whether or not "L1 side/Ln side division" is designated. The prepared model is sent to the 3D-CAD system 30. Hereafter the operations at the above-mentioned step S31 and following steps will be performed.

It is to be noted that at steps S26, 27, 29, and S30, the 3D converter 13 performs the model conversion depending on the conditions set at steps S16–S23.

Also, while detailing the outer shape of the mechanical component is set at step S21, it may be possible to designate only the mechanical component/electric component having a possibility of interference with the cabinet.

Figure 8A:
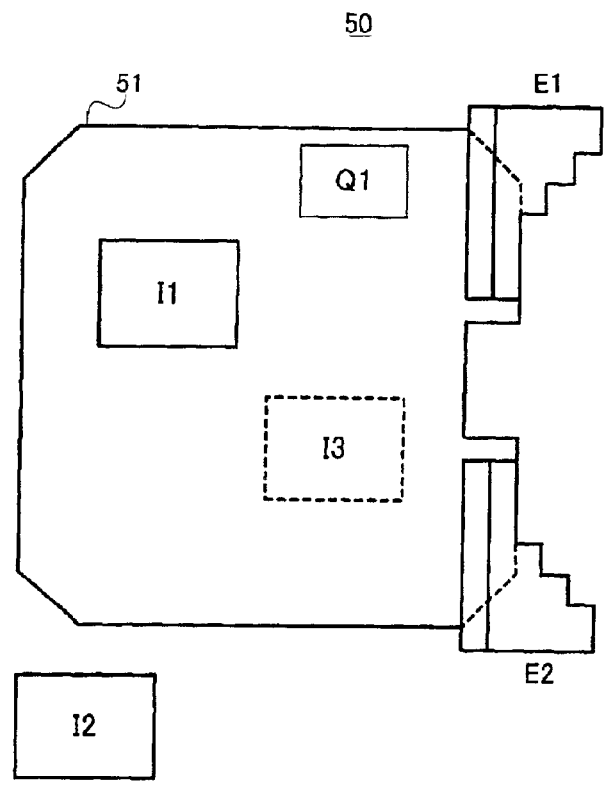
FIGS. 8A and 8B are diagrams showing a conversion example of a unit-type 3D model in a printed circuit board design system according to the present invention.
Figure 8B:
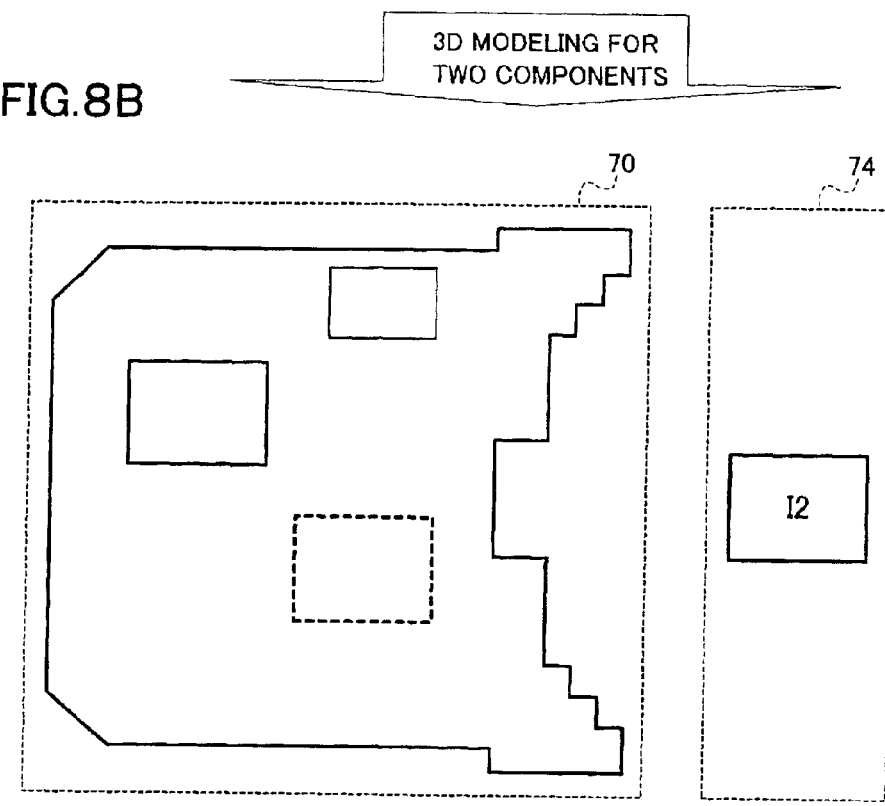

FIGS. 8A and 8B show a conversion example of a unit-type model in the 3D converter 13 executed at step S26 in FIG. 7. FIG. 8A shows a mounting example of a printed circuit board 50 prepared by the CAD system 10, which is the same as the mounting example shown in FIG. 4. In FIG. 8B, the printed circuit board 50 in FIG. 8A is converted into the printed circuit board model 70 and the unarranged component model 74 of the unarranged component I2.

It is to be noted that at step S29 in FIG. 7, the unarranged component I2 is not modeled, but only the printed circuit board 50 is converted into the unit-type model.

Figure 9A:
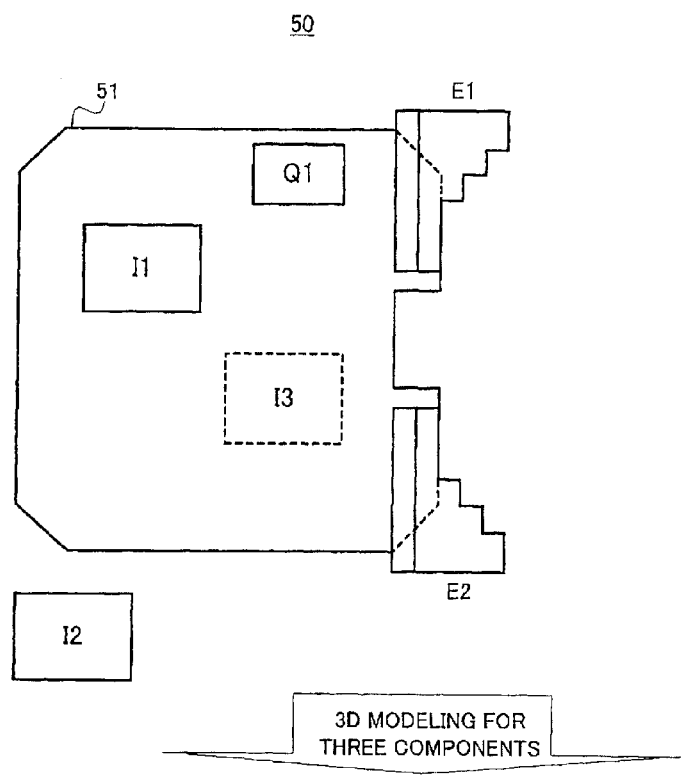
FIGS. 9A and 9B are diagrams showing a conversion example of a division-type 3D model in a printed circuit board design system according to the present invention.
Figure 9B:
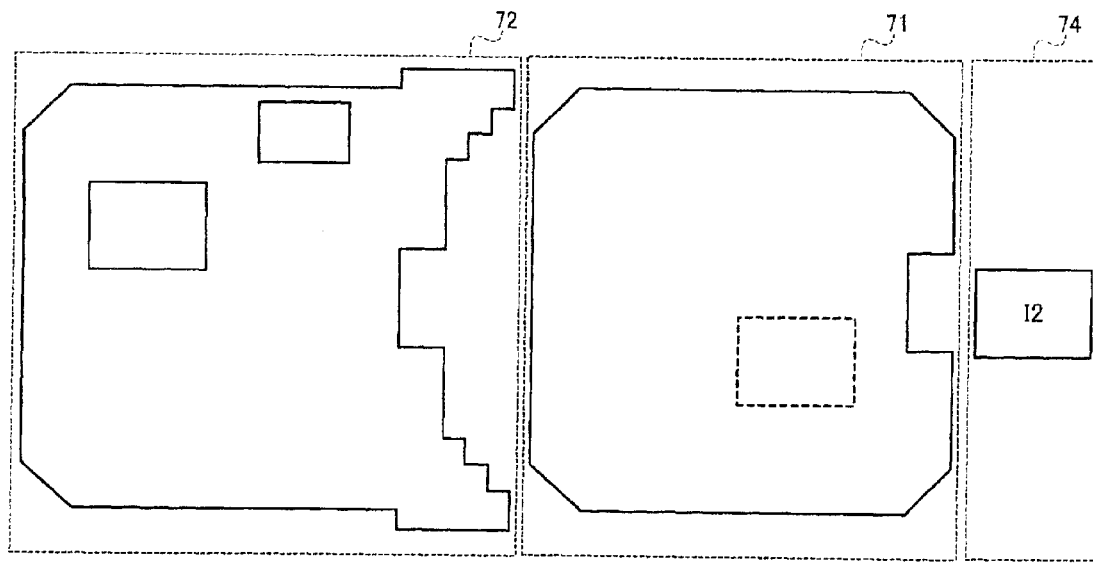

FIGS. 9A and 9B show a conversion example of a division-type model in the 3D converter 13 executed at step S27 in FIG. 7. FIG. 9A is the same as the mounting example shown in FIG. 4. In FIG. 9B, the printed circuit board 50 in FIG. 9A is converted into the L1 side model 72, the Ln side model 71, and the unarranged component model 74.

It is to be noted that at step S30 in FIG. 7, the unarranged component I2 is not modeled, but only the printed circuit board 50 is converted into the L1 side model 72 and the Ln side model 71.

Figure 10A:
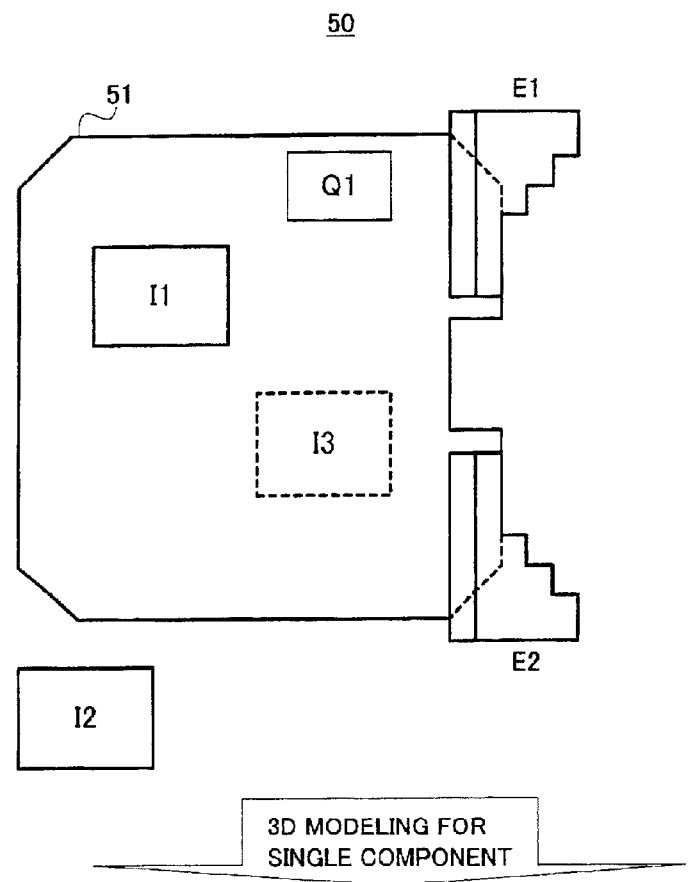
FIGS. 10A and 10B are diagrams showing a conversion example of a single-type 3D model in a printed circuit board design system according to the present invention.
Figure 10B:
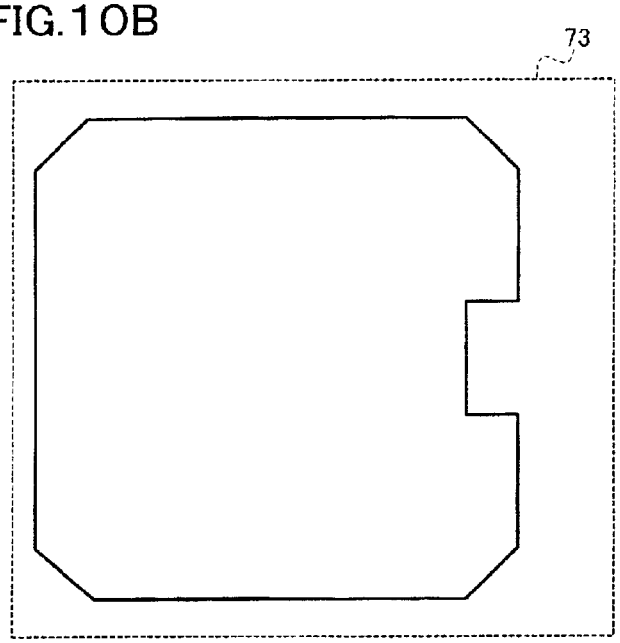

FIGS. 10A and 10B show a conversion example of a printed board single-type model in the 3D converter 13 executed at step S15 in FIG. 7. FIG. 10A is the same as the mounting example shown in FIG. 4. In FIG. 10B, only the printed board 51 of the printed circuit board 50 in FIG. 10A is converted into the printed board model 73.

Figure 11A:
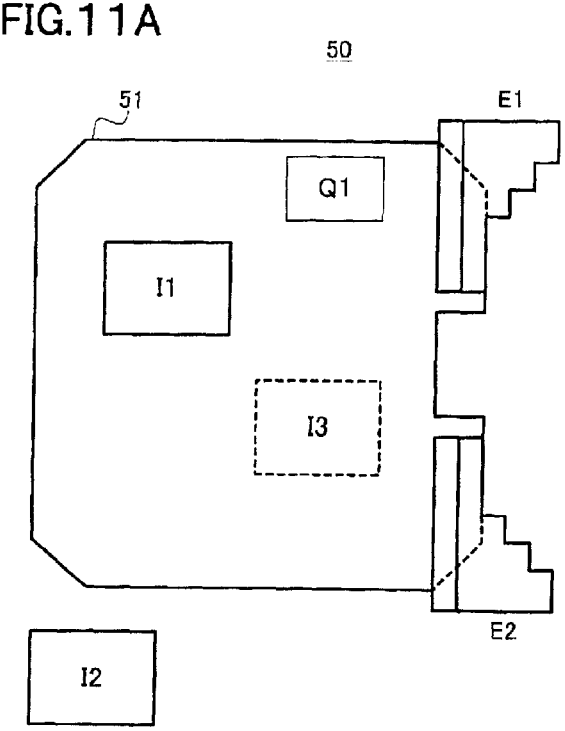
FIGS. 11A and 11B are diagrams showing a conversion example of a library-type 3D model in a printed circuit board design system according to the present invention.
Figure 11B:
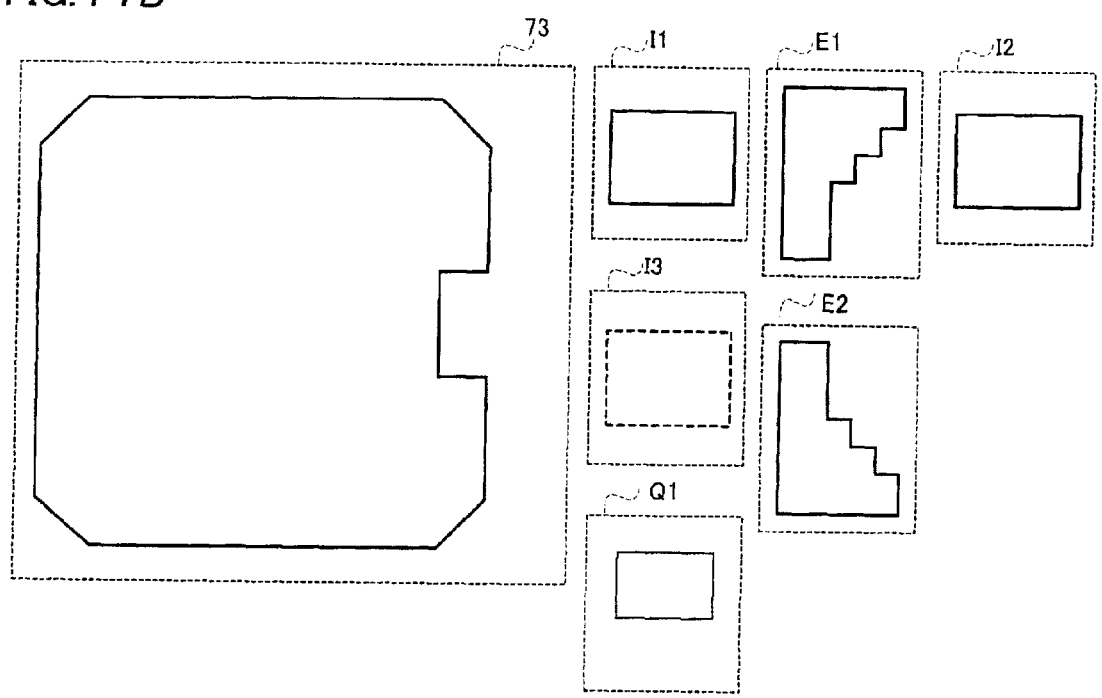

FIGS. 11A and 11B show a conversion example of a library-type model in the 3D converter 13 executed at step S12 in FIG. 7. FIG. 11A is the same as the mounting example shown in FIG. 4. In FIG. 11B, the components forming the printed circuit board 50 in FIG. 1A are prepared in the form of a library and are respectively converted into the printed board model 73, the components I1–I3 models, the component E1 and E2 models, and the component Q1 model.

Figure 12:
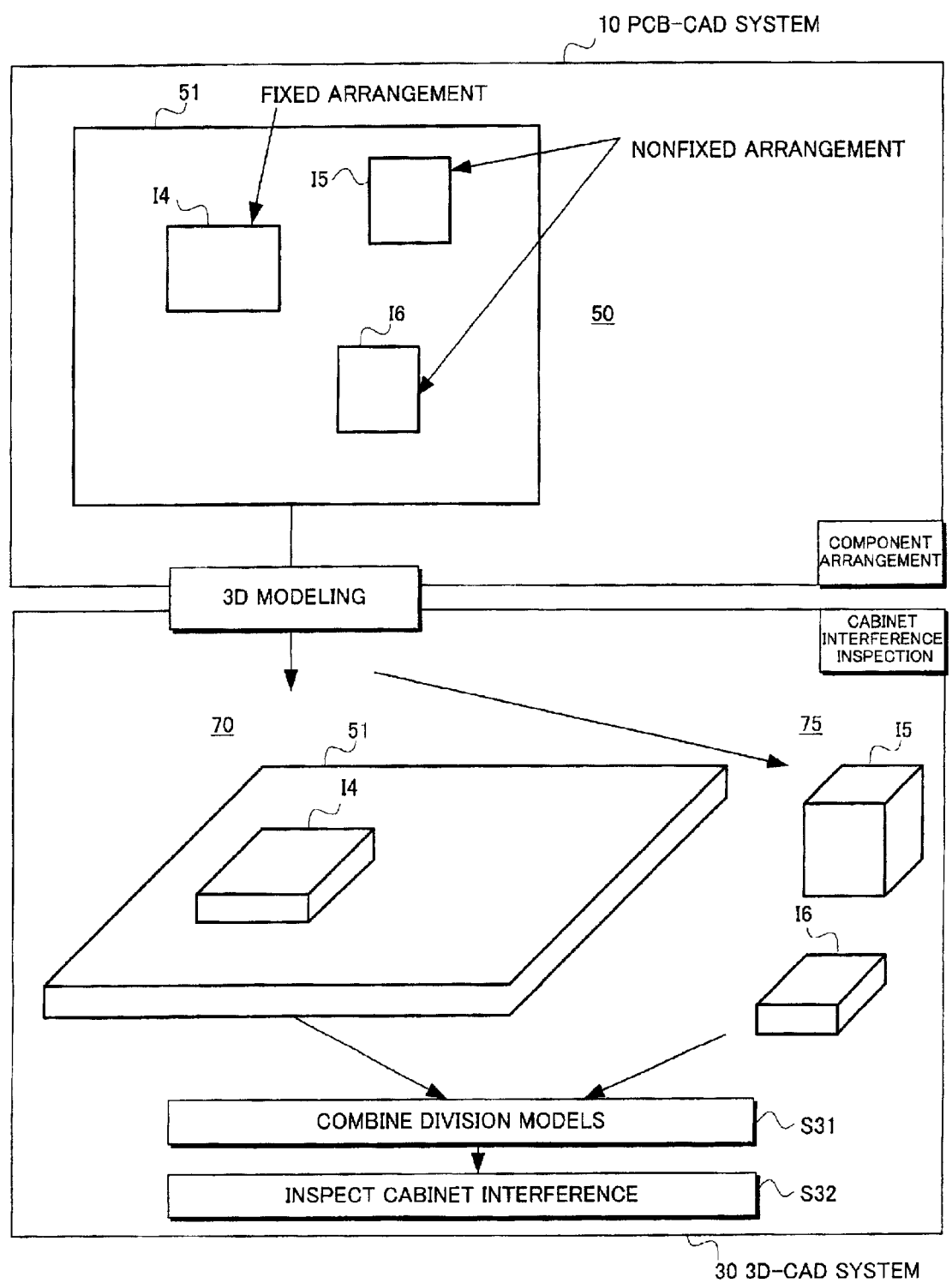
FIG. 12 is a diagram showing a conversion example of a 3D model of a nonfixed component in a printed circuit board design system according to the present invention.

FIG. 12 shows a conversion example in which the attribute of the component arrangement, i.e. fixed/nonfixed is considered at steps S26, S27, S29, and S30 in FIG. 7.

The PCB-CAD system 10 performs a mounting design of the printed circuit board 50 having the printed board 51 and the components I4–I6 as constitutional elements. The 3D converter 13 recognizes, referring to the mounting design DB (not shown), that the fixing flag of the component I4 is "fixed" and the fixing flags of the components I5 and I6 are "nonfixed".

The 3D converter 13 converts the printed circuit board 50, in consideration of the fixing attributes of the components, into the printed circuit board model 70 composed of the printed board 51 and the component I4, and the component I5 model and the component I6 model which are nonfixed component models 75.

The 3D-CAD system 30 to which these models are inputted prepares the model of the whole printed circuit board where the divided models are combined at step S31 in FIG. 7, and then whether or not the combined model and the cabinet interfere with each other is inspected at step S32. If they do not interfere with each other (at step S33), the process proceeds to the next step S34. Otherwise a mounting design of changing the shape of the cabinet, moving the model of the nonfixed components to the position where they do not interfere, or the like can be performed on the 3D-CAD system 30.

Figure 13A:
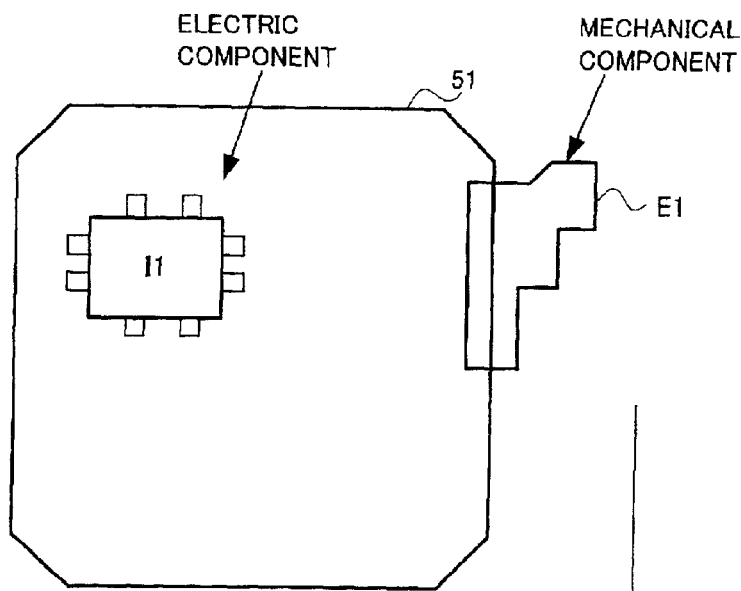
FIGS. 13A–13E are diagrams showing a conversion example of a 3D model of an electric component/mechanical component in a printed circuit board design system according to the present invention.
Figure 13B:
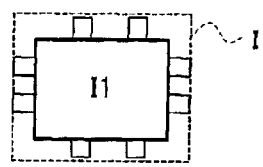
Figure 13D:
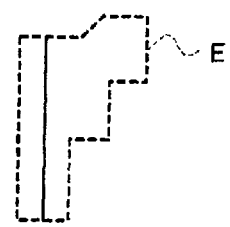
Figure 13C:
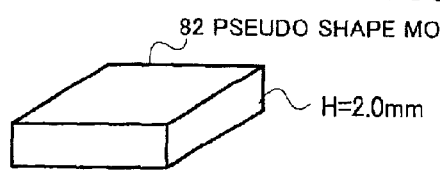

FIGS. 13A–13E show modeling examples of electric component and mechanical component performed at step S21 in FIG. 7. In FIG. 13A, the electric component I1 and the mechanical component E1 are mounted on the printed board 51. FIG. 13B shows a rectangle I which is the largest outer shape on the plane of the electric component I1. FIG. 13C shows a pseudo shape model 82 providing the height H=2.0 mm of the component I1 to the rectangle I.

Figure 13E:
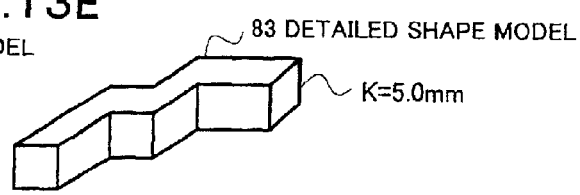

FIG. 13D shows an accurate outer shape E of the mechanical component E1 on the plane. FIG. 13E shows a detailed shape model 83 providing the height K=5.0 mm of the component E1 to the plane outer shape E.

Figure 14:
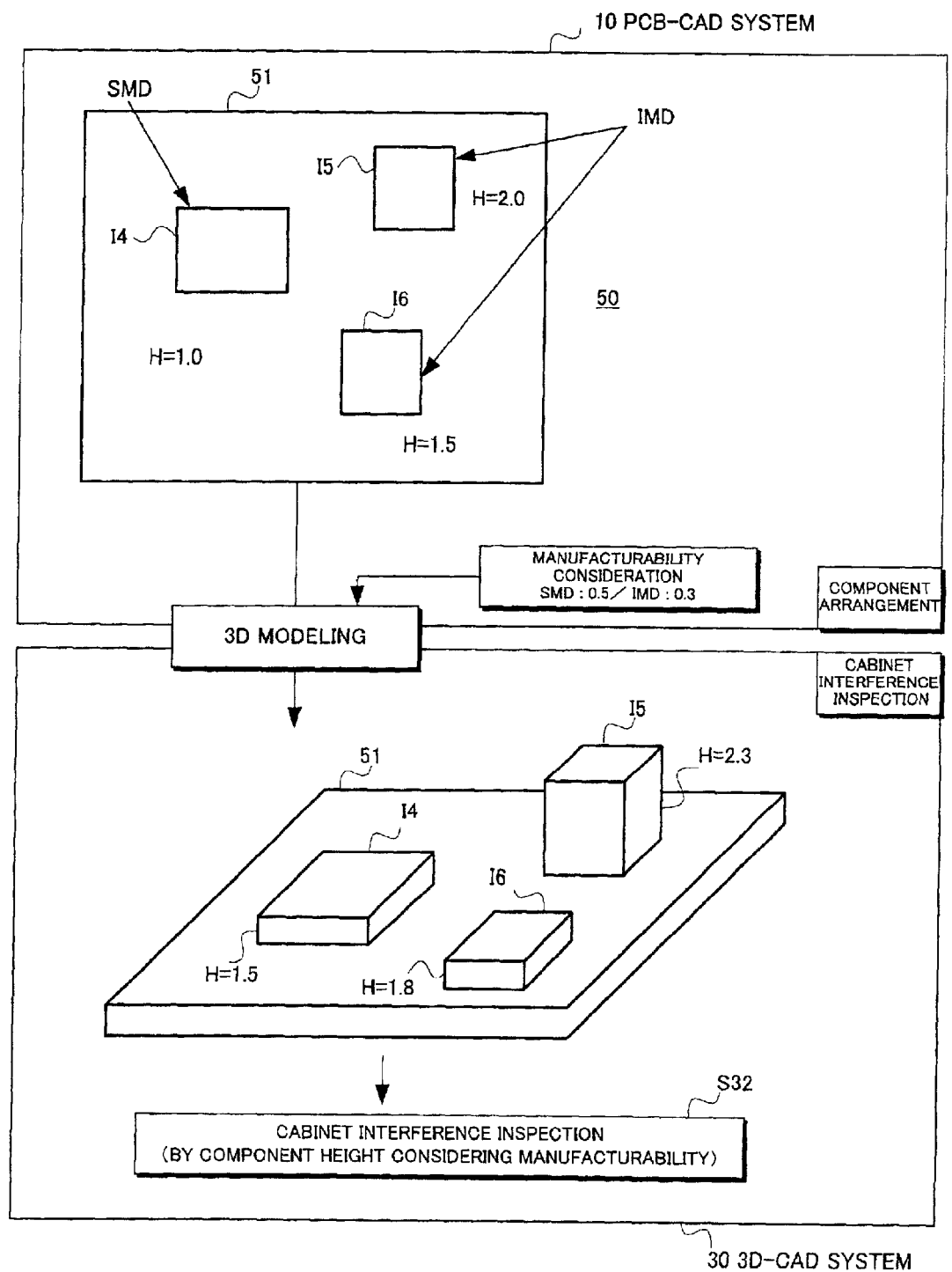
FIG. 14 is a diagram showing a conversion example of a 3D model in consideration of a manufactured height in a printed circuit board design system according to the present invention.
Figure 15:
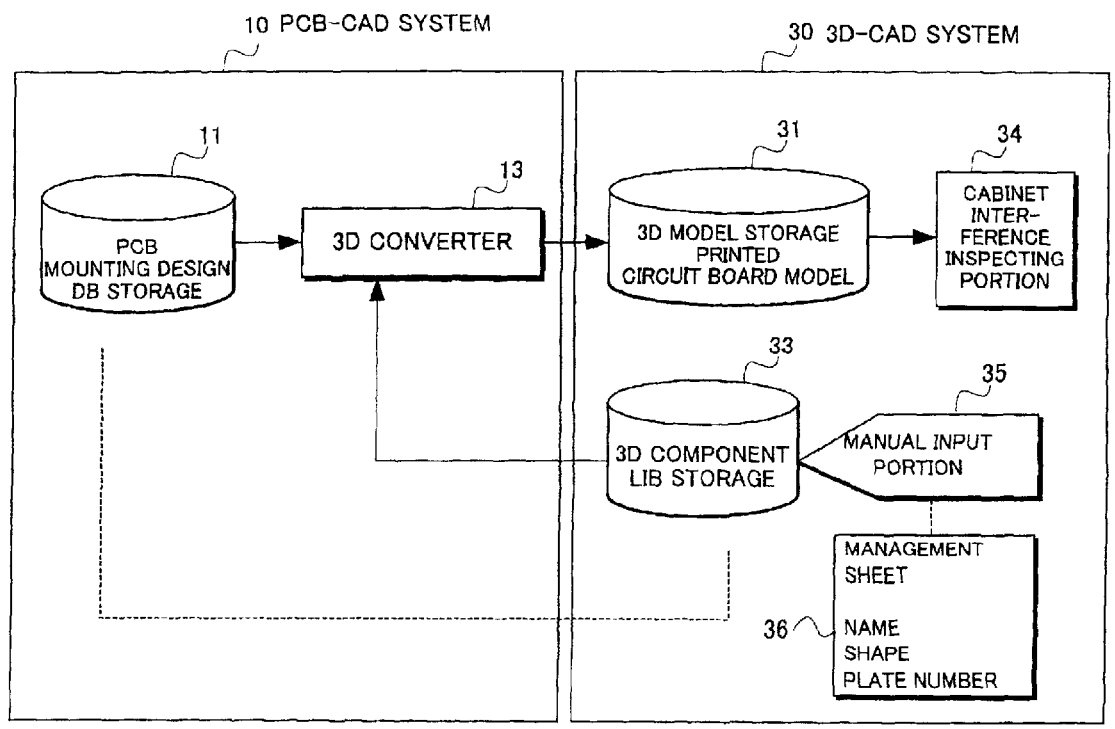
FIG. 15 is a block diagram showing a conversion example of a 3D model of a printed circuit board in a prior art printed circuit board design system according to the present invention.
Figure 16:
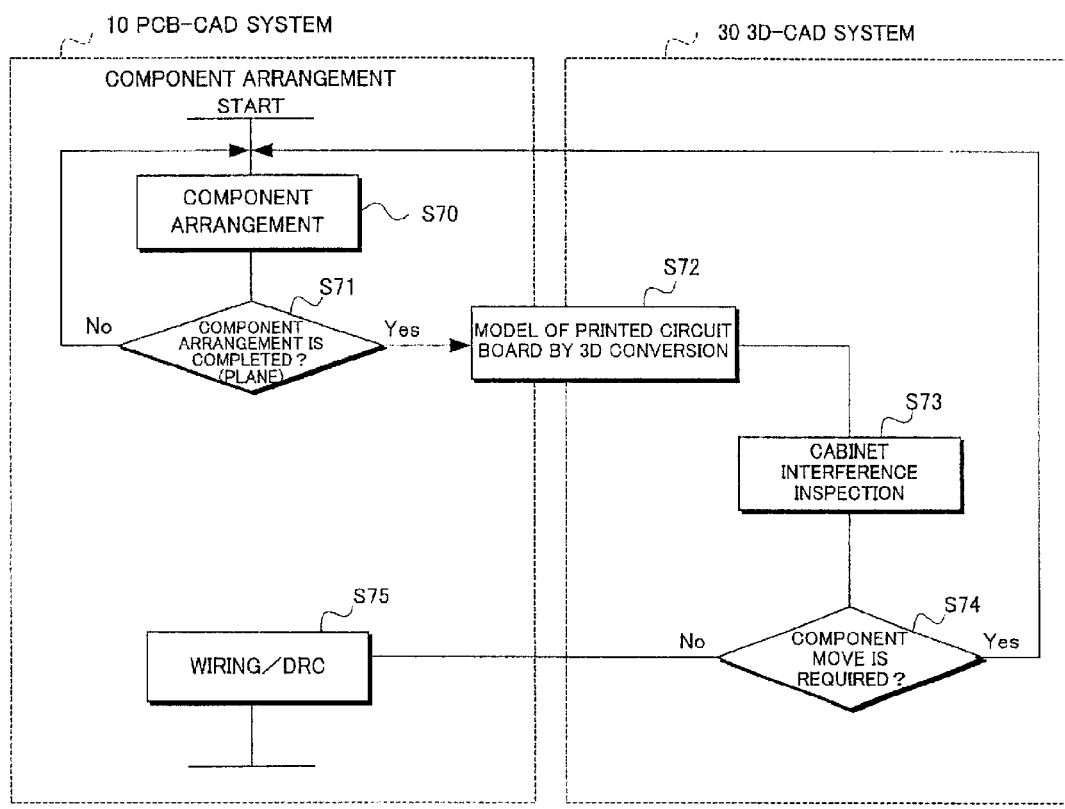
FIG. 16 is a flow chart showing an operation procedure of a 3D model conversion in a prior art printed circuit board design system.
Figure 17:
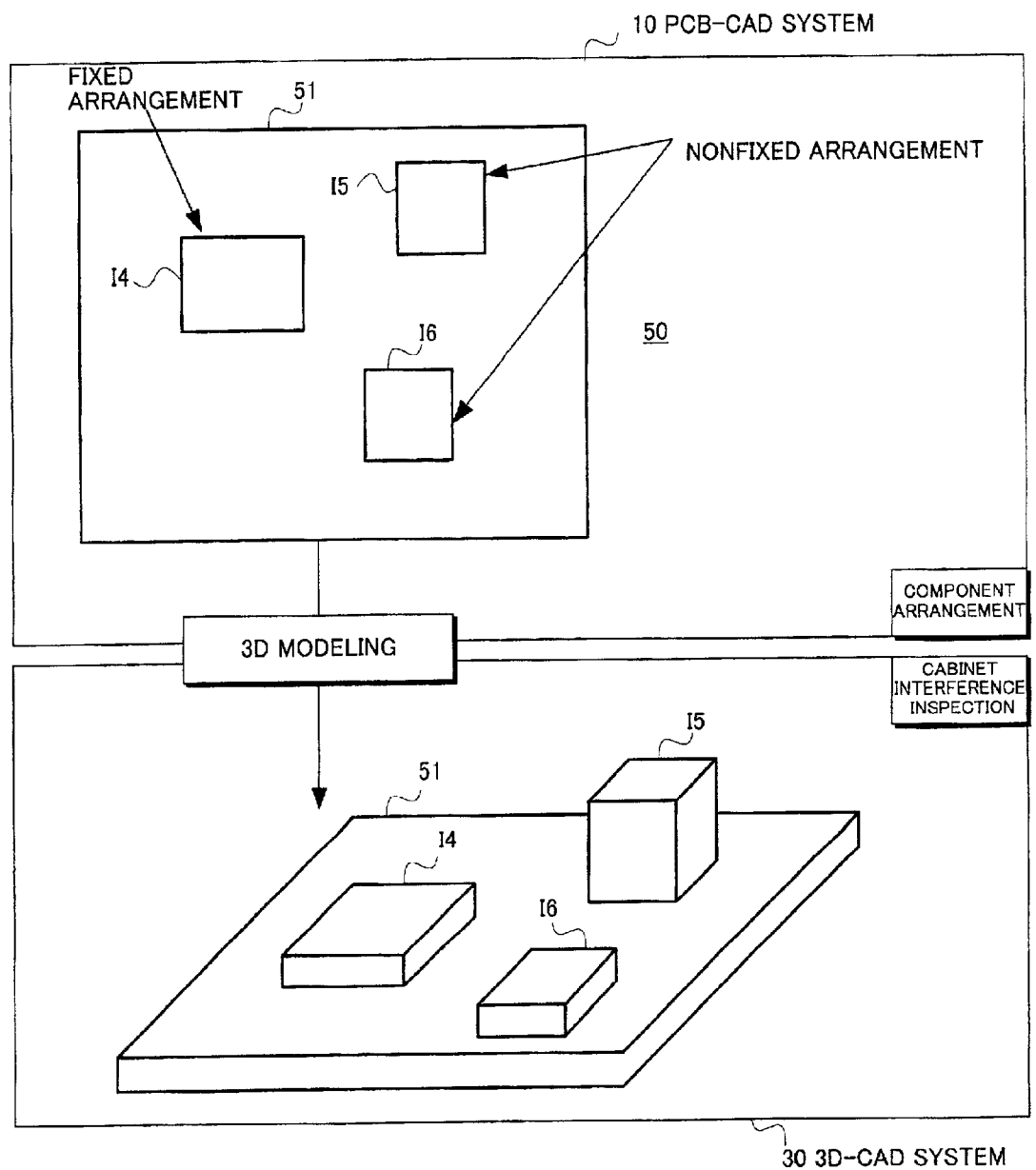
FIG. 17 is a diagram showing an example of a component arrangement in a prior art printed circuit board design system.

FIG. 14 shows a modeling example in consideration of the manufacturability of the component, especially the manufactured height by soldering executed at step S16 in FIG. 7.

The PCB-CAD system 10 executes the mounting design of the printed circuit board 50 in which the printed board 51, the SMD-type component I4, the IMD-type components I5 and I6 are made constitutional elements. It is to be noted that the heights of the components I1–I6 are respectively 1.0, 2.0, and 1.5 mm.

The 3D converter 13 receives the instructions, in consideration of the "manufacturability consideration" from the panel 12, that the soldering of the SMD-type and IMD-type components should have values of 0.5 mm and 0.3 mm respectively, the modeling is performed with the heights of the components I4, I5 and I6 being respectively made 1.5 mm, 2.3 mm, and 1.8 mm, whereby the models are sent to the 3D-CAD system 30.

The 3D-CAD system 30, as shown at step S32 in FIG. 7, performs the interference inspection of the model and the cabinet.

As described above, a printed circuit board design system according to the present invention is arranged such that a printed circuit board is converted, without mistakes, into an accurate 3D model depending on stages of the mounting design. Therefore, it becomes possible for a designer to concurrently perform an arrangement of a component, an inspection of a cabinet interference, and the like.

What we claim is:

1. A printed circuit board design system for generating a 3D model of a printed circuit board which mounts a component on a printed board, and performing with a three-dimensional CAD system a mounting design which includes a cabinet, the system comprising:

a converter converting the printed circuit board into one or more models based on attributes preliminarily added to the component, by disassembling the printed circuit board, according to the attributes, into one or more constitutional elements to be converted into the models.

2. The printed circuit board design system as claimed in claim 1 wherein when the attribute is a mounting side, the converter converts the printed board and a component mounted on an L1 side into an L1 side portion model, and converts the printed board and a component mounted on an Ln side into an Ln side portion model.

3. The printed circuit board design system as claimed in claim 1 wherein when the attribute is at least one of an arrangement and a fixation, the converter converts the component which is not arranged on the printed circuit board into an unarranged component model, and converts the component which is not fixed into a nonfixed component model.

4. The printed circuit board design system as claimed in claim 1 wherein the converter converts the printed board and the component into a library model related to the attribute.

5. The printed circuit board design system as claimed in claim 1 wherein the converter converts the component into either a pseudo shape model or a detailed shape model.

6. A method for generating a 3D model of a printed circuit board which mounts a component on a printed board, and performing with a three-dimensional CAD system a mounting design which includes a cabinet, the method comprising the operations of:

converting the printed circuit board into one or more models based on attributes preliminarily added to the component, by disassembling the printed circuit board, according to the attributes, into one or more constitutional elements to be converted into the models.

7. The method as claimed in claim 6, wherein when one of the attributes is a mounting side, the converting operation converts the printed board and a component mounted on an L1 side into an L2 side portion model, and converts the printed board and a component mounted on an Ln side into an Ln side portion model.

8. The method as claimed in claim 6, wherein when one of the attributes is at least one of an arrangement and a fixation, the converting operation converts the component which is not arranged on the printed circuit board into an unarranged component model, and converts the component which is not fixed into a nonfixed component model.

9. The method as claimed in claim 6, wherein the converting operation converts the printed circuit board and the component into a library model related to one of the attributes.

10. The method as claimed in claim 6, wherein the converting operation converts the component into either a pseudo shape model or a detailed shape model.

* * * * *